United States Patent [19]

Lee

[11] Patent Number: 5,719,720
[45] Date of Patent: Feb. 17, 1998

[54] HEAD SUSPENSION MECHANISM AND APPARATUS FOR ITS CONTROL

[75] Inventor: Hae-Jung Lee, Suwon, Rep. of Korea

[73] Assignee: SamSung Electronics Co., Ltd., Kyungki-do, Rep. of Korea

[21] Appl. No.: 522,155

[22] Filed: Aug. 31, 1995

[30] Foreign Application Priority Data

Sep. 1, 1994 [KR] Rep. of Korea ............... 22006

[51] Int. Cl.⁶ ............... G11B 19/00; G11B 21/12; G11B 21/16
[52] U.S. Cl. ............... 360/71; 360/75; 360/105
[58] Field of Search ............... 360/77.16, 75, 360/103, 105, 71

[56] References Cited

U.S. PATENT DOCUMENTS

| | | | |
|---|---|---|---|
| 4,605,977 | 8/1986 | Matthews | 360/75 X |
| 4,651,242 | 3/1987 | Hirano et al. | 360/97.01 X |
| 4,843,502 | 6/1989 | Tagawa | 360/105 |
| 5,012,369 | 4/1991 | Owe et al. | 360/104 |
| 5,068,841 | 11/1991 | Nakayama et al. | 360/104 |
| 5,307,224 | 4/1994 | Minase | 360/105 |
| 5,313,445 | 5/1994 | Wada | 360/75 X |
| 5,377,058 | 12/1994 | Good | 360/75 |

FOREIGN PATENT DOCUMENTS

| | | |
|---|---|---|
| 0451959A2 | 10/1991 | European Pat. Off. |
| 0605343A1 | 7/1994 | European Pat. Off. |
| 0665548A1 | 8/1995 | European Pat. Off. |
| 63-187477 | 8/1988 | Japan. |
| 311481 | 12/1989 | Japan 360/75 |
| 113879 | 5/1991 | Japan 360/75 |
| 129072 | 4/1992 | Japan 360/75 |
| 47020 | 2/1993 | Japan 360/75 |

*Primary Examiner*—Aristotelis M. Psitosi
*Assistant Examiner*—Alan Faber
*Attorney, Agent, or Firm*—Robert E. Bushnell, Esq.

[57] ABSTRACT

A head suspension mechanism having a load beam and a layer of piezoelectric material on at least one surface of a resilient portion of the load beam adjacent an arm of an actuator in a hard disk drive. A controller apparatus provides a control signal to the piezoelectric material to induce a piezoelectric effect of the piezoelectric material which causes the load beam to raise the head slider from the surface of a disk in a start mode before the disk begins to rotate, and also causes the load beam to keep the head slider from contacting the surface of a disk until the disk comes to a complete stop in a stop mode.

17 Claims, 5 Drawing Sheets

DISK ROTATION DIRECTION

HEAD SUSPENSION MECHANISM AND APPARATUS FOR ITS CONTROL

CLAIM OF PRIORITY

This application makes reference to, and claims all benefits accruing under 35 USC §119 from our earlier application entitled Non-contact Start/stop Control Method and Apparatus in Recording Medium of Head Suspension filed in the Korean Industrial Property Office on 1 Sep. 1994 and there assigned Serial No. 22006/1994.

BACKGROUND OF THE INVENTION

1. Technical Field

The present invention relates to a head suspension mechanism and apparatus for its control. Further, the present invention relates to a driving control method of a head suspension mechanism in a hard disk drive. More particularly, the present invention relates to a head suspension mechanism in the hard disk drive in which a head slider is does not contact a revolving hard disk during start and stop modes of operations of the hard disk.

2. Background Art

Recently, the trend in the art is towards hard disk drives having high capacity. Therefore, the head of the hard disk drive should have a consistently low flying height. The flying height is between 3.0 and 20 μm (microns). In order to assure such a flying height, the gram load of the head suspension mechanism and the flying force of an air bearing surface of a slider are used in determining how to maintain the flying height. According to the air bearing surface, a spindle motor of the hard disk drive is maintained at the low flying height when the spindle motor rotates at constant speed; however, the air bearing surface of the head is in contact with the disk during the start and stop modes of the spindle motor. I have discovered that friction between the air bearing surface of the head and the disk generates particles which affect the hard disk drive. Further, I have noticed that due to the particles, some problems occur because the life and reliability of the hard disk drive are reduced.

In U.S. Pat. No. 5,012,369, to Takeshi Owe et al. entitled Head Suspension Mechanism Of A Recording Apparatus With A Constant Flying Height, the load of the suspension mechanism is adjusted by one or more adjusting screws. Accordingly, the pressure of the head slider on the disk can be reduced and the flying height of the head slider is easier to maintain. There is a problem however, because although the pressure of the head slider on the disk may be reduced, the head slider does remain in contact with the disk until a sufficient air flow is generated by the rotation of the disk that will raise the head slider from the surface of the disk. In this case, friction is generated between head slider and the disk which could then lead to the problem of particles being created that will, at some point, affect the operation of the hard disk drive.

Junichiro Nakayama, et al. describe in U.S. Pat. No. 5,068,841 a Magneto-Optical Recording/Reproducing Device having an adjustment device which adjusts the downward force which a head suspension mechanism puts on a slider. It is known that the air flow, which causes the slider to float, increases as the head is moved from the inner to the outer circumference of a disk. The adjustment device is provided in order to keep the height at which the head slider is floating constant as the radial position of the head slider above the disk changes. Accordingly, the adjusting device allows the force exerted by the head suspension mechanism to increase as the head slider moves in an outward radial direction. I have found that a problem still exists because the head slider comes into contact with the surface of the disk during start and stop modes. Accordingly, I have observed that when the disk begins to rotate or before the disk comes to a complete halt, the head slider will cause friction upon contact with the disk which could then lead to the problem of particles being created that will, at some point, deleteriously effect the operation of the recording and reproducing device.

SUMMARY OF THE INVENTION

It is therefore object of the present invention to provide an improved head suspension mechanism.

It is another object to provide a head suspension mechanism to overcome the problems of contact friction between a head slider and a disk in a hard disk drive during start and stop modes.

It is also an object of the present invention to provide a head suspension mechanism which is controlled to raise a head slider from the surface of a disk before the disk starts to rotate during a start mode.

It is still another object of the present invention to provide a head slider mechanism which is controlled to keep the head slider from contacting the surface of a disk until the disk comes to a complete stop during a stop mode.

It is yet another object of the present invention to control the flying height of a head slider as the radial position of the head slider over a disk changes while the disk is rotating at a constant speed.

These and other objects of the present invention can be achieved according to the principles of the present invention wherein a load beam of a head suspension mechanism has a layer of piezoelectric material on at least one surface of a resilient portion of the load beam adjacent to an arm of an actuator in a hard disk drive. A controller apparatus provides a control signal to the piezoelectric material to induce a piezoelectric effect by the piezoelectric material which causes the load beam to raise the head slider from the surface of a disk during a start mode before the disk begins to rotate, and also causes the load beam to keep the head slider from contacting the surface of a disk until the disk comes to a complete stop during a stop mode.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
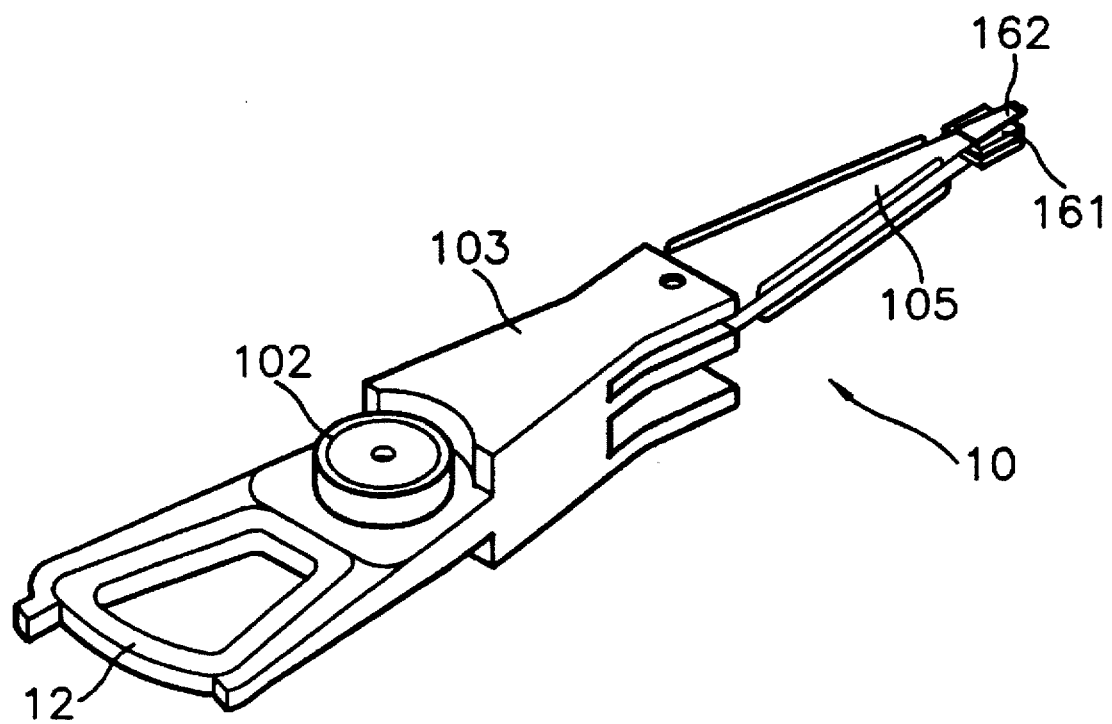
FIG. 1 is a view illustrating a head suspension mechanism.

FIG. 1 shows an actuator 10 of a hard disk drive. The actuator 10 is constructed with a voice coil motor 12, a pivot bearing 102 and an arm 103. Arm 103 supports a suspension mechanism that uses a load beam 105, a gimbal 162 and a head slider 161.

Figure 2:
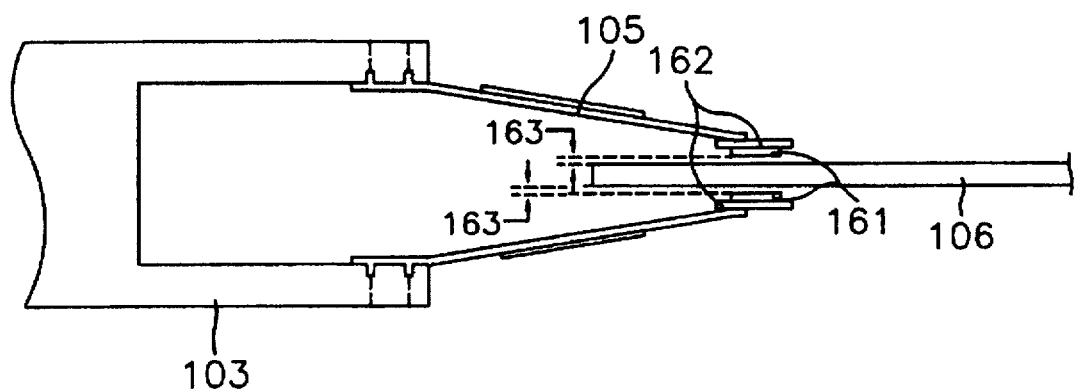
FIGS. 2 and 3 are views for explaining a constant flying height in an non-contact state between a head slider coupled with the head suspension mechanism and a disk.

FIG. 2 shows an arrangement for providing heads for reading data from a high capacity disk. Arm 103 supports two load beams 105, gimbals 162 and head sliders 161. The flying height 163, on each side of the disk 106, is an interval between the head sliders 161 and a disk 106. Since such flying height is very related with the high capacity and performance of the hard disk drive, it functions as an important element in the hard disk drive. One operation in a magnetic write/read apparatus such as a hard disk drive is one state during which the head slider 161 is in contact with the disk 106. In an apparatus such as hard disk drive, which should have a long durability time, no abrasions in the disk 106 should occur when the head slider 161 is in contact with the disk 106. Particles are created however, due to the abrasion generated when the head slider 161 contacts the disk 106, thus creating problems in the hard disk drive.

Figure 3:
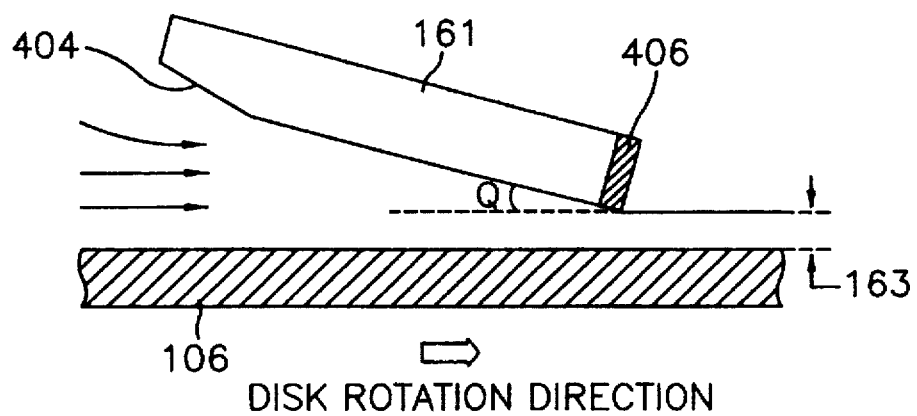

In order to minimize the abrasion caused by the contact between the head slider 161 and the disk 106, the head slider 161 is flown in response to the force of fluid, i.e., air, generated by rotation of the disk 106 as is shown in FIG. 3. According to this method, the gram load of the suspension mechanism as well as the shape of the head slider 161 of the suspension mechanism are taken into account in order to fly head slider 161. The head slider 161 in FIG. 3 is shown to have a leading end 404 tapered at a predetermined angle, which may be approximately equal to the skew angle Q, and a trailing end having a transducer 406 mounted thereto. Since the disk does not always have constant rotational speed, however, the linear velocity of the air at different radial positions of the head slider 161 differs according to the radius of the hard disk drive. Thus, as the flying height 163 nears the outer circumference of the disk, a problem occurs because the flying height becomes higher. In order to solve this problem, the performance, capacity and endurance of the hard disk drive have been increased by applying a skew angle Q formed in between a proceeding direction of the disk 106 and the axial direction of head slider 161. In the case that head slider 161 is flown by fluid mechanical force created by the turning effect of the disk 106 however, the disk 106 most commonly used can be contacted by head slider 161 during the start or stop mode of the disk 106. That is, in the start mode of the disk 106, until the time that the rotation of disk 106 arrives at a constant speed and the head slider 161 is thus takes-off, i.e., lifts off disk 106, head slider 161 is in contact with disk 106 to thereby cause head slider 161 to slide on the surface of disk 106, thus generating friction. While, in the stop mode of disk 106, disk 106 decelerates from the constant rotation speed to thereby lower head slider 161 toward the surface of disk 106. Friction is also generated when head slider 161 contacts disk 106 before disk 106 is completely stopped. In a general case, so as to reduce the damage of such fiction, a parking area is established on disk 106. The head slider 161 takes off from or returns to the surface of disk 106 within this parking area. Further, in order to reduce the friction generated when the head slider takes off from or returns to the surface of disk 106, there is often used a method for classing the disk according to the texture of the data and parking areas and a lubrication state of the disk. However, the friction generated as the head slider 161 takes off from or returns to the surface of the disk 106 still has a serious problem of deleteriously effecting the endurance of the hard disk drive.

Further, according to the contact friction generated during the start and stop modes of the disk, there arise some other problems. First, it may be impossible to rotate disk 106 due to an adsorption phenomenon between head slider 161 and the surface of disk 106. Second, damage to the surface of disk 106 and head slider 161 may occur by means of impurities generated due to abrasion when the head slider is in contact with disk 106. These result in generation of a frictional sound during the start and stop modes of disk 106.

Figure 4:
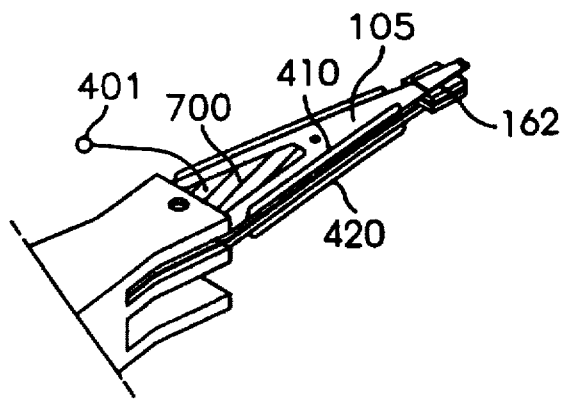
FIG. 4 is a view illustrating a set of piezoelectric material for start/stop control under a state that the head slider of the head suspension mechanism is not in contact with the disk according to the principles of the present invention.

FIG. 4 is a view explaining one embodiment of the present invention for overcoming the problems discovered and explained with respect in FIGS. 1 through 3. In the configuration of FIG. 4, a piezoelectric material 700 is attached to a resilient upper portion and a rigid portion of the load beam 105: The rigid portion of the load beam 105 is defined by the side flange 410 of the suspension mechanism extended over the disk. Side flange 421 is attached to the suspension mechanism which is situated below the disk. Load beam 105 is shown as supporting gimbal 162 to which a head slider is mounted.

Figure 5:
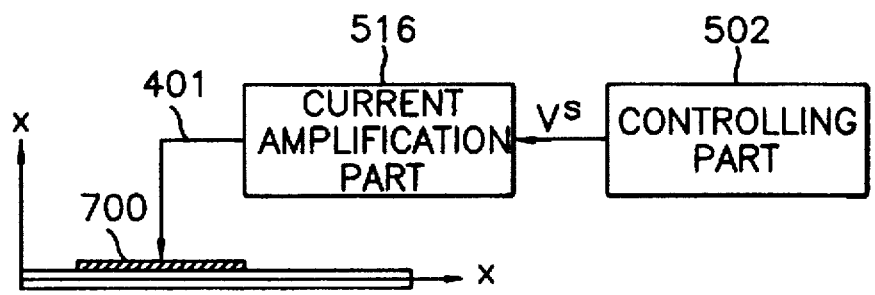
FIG. 5 is a circuit diagram illustrating the start/stop control of the head suspension mechanism according to the principles of the present invention.

A control signal, as shown in FIG. 5, is generated from a controlling part 502 according to a rotation state of disk 106. The control signal is amplified in a current amplification part 516 and applied to the piezoelectric material 700 through wire 401. The piezoelectric material 700 receiving the control signal, which is generated in the controlling part 502 according to the function and the operational state of the disk and amplified by current amplification part 516, generates force so that load beam 105 can be bent or curved by compression and expansion caused according to the piezoelectric phenomenon of piezoelectric material 700.

The piezoelectric material 700 is capable of bending or curving the resilient portion of load beam 105 according to characteristic thereof described below in conjunction with FIGS. 6A, 6B, 6C, 7A, 7B, and 7C.

The force generated in the piezoelectric material 700 is transferred to load beam 105, and enables head slider 161 to separate from disk 106 before the disk starts to rotate, and to remain separated from the disk before the disk stops rotating.

Thus, in order to obtain the force to be applied to load beam 105 according to the principles of present invention, the piezoelectric phenomenon of the piezoelectric material 700, corresponding to a well known variable form of construction of piezoelectric materials, used in the present invention is explained in connection with FIGS. 6A, 6B, 6C, 7A, 7B, and 7C. The piezoelectric phenomenon is defined such that when pressure is provided to any crystalline form of a piezoelectric material, that material of the crystals generates an electric field in proportion to the pressure added thereto. Further, the piezoelectric phenomenon is defined as a transformation caused due to an electric field in a case that the electric field is provided to the crystals. Owing to a reversible connection relationship between machine energy and electric energy, piezoelectric materials are widely used in sound convertors, resonators, accelerometers, wave motion filters, photoelectric circuits, and photo-elastic circuits.

Figures 6A, 6B, 6C:
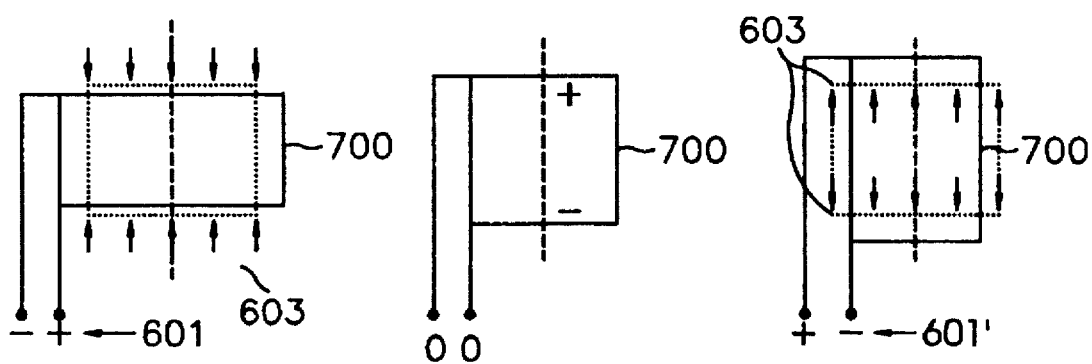
FIGS. 6A–6C are views for explaining the reverse direction effect (electric field→stress field) of the piezoelectric material in one embodiment of the present invention.

Regarding the description of FIGS. 6A–6C, when an electric field is provided to piezoelectric material 700, FIGS. 6A and 6C show that piezoelectric material 700 is transformed by the stress field 603 generated. In more material 7, FIG. 6A shows a compression phenomenon of the piezoelectric material 700 caused by application of electric field 601 applied thereto. FIG. 6B shows an original state of the piezoelectric material 700 when no electric field is applied thereto. FIG. 6C shows an expansion phenomenon of the piezoelectric material 700 caused by application of electric field 601'. Electric field 601' has a polarity that is a reverse of the polarity of the electric field 601 shown in FIG. 6A.

Figures 7A, 7B, 7C:
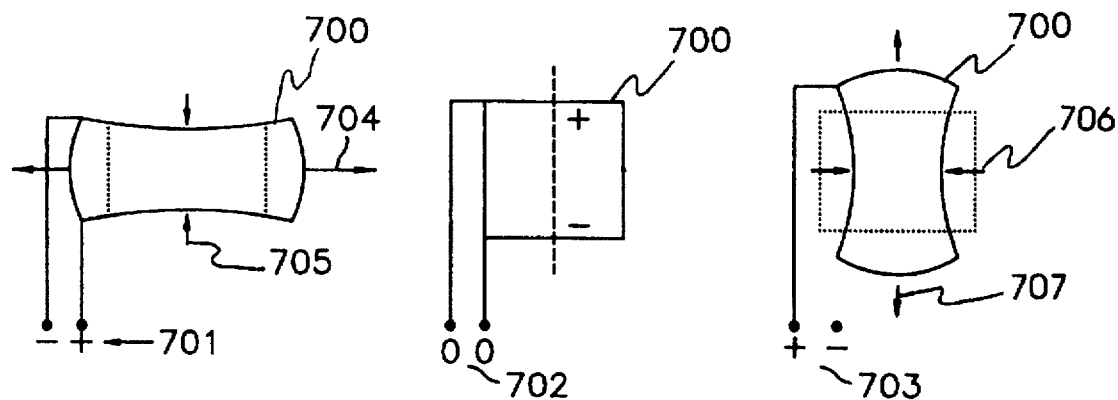
FIGS. 7A–7C are views for explaining the order direction effect (stress field→electric field) of the piezoelectric material in another embodiment of the present invention.

Regarding the description of FIGS. 7A–7C, an electric field is generated by the piezoelectric material 700, FIGS. 7A and 7C show that the piezoelectric material 700 is transformed by an external force. In more detail, FIG. 7A shows an electric field 701 generated by an extension force or a compression force 705 applied to piezoelectric material 700. FIG. 7B shows that no electric field 702 is generated when the original state of the piezoelectric material 700 is not changed as a result of the application of an external force. FIG. 7C shows an electric field 703, having a polarity reversal of the polarity of electric field 701, generated by a compression force 706 or an extension force 707 applied to piezoelectric material 700.

Figure 8:
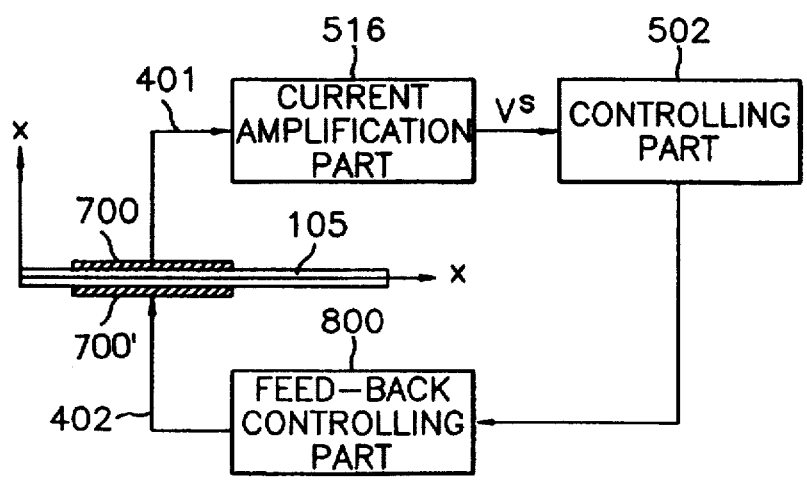
FIG. 8 is a view illustrating that the piezoelectric material is attached to two ends of the suspension mechanism and the piezoelectric material performs a sense function according to the transformation of the suspension.

FIG. 8 is a view illustrating another embodiment of the present invention, which shows a device for controlling displacement of the distal end of load beam 105 supporting head slider 161 by regulating the stress applied by material 700' to load beam 105 and thus, the degree of bend of load beam 105, to which the piezoelectric material 700 is attached, by compression or extension of piezoelectric material 700, load beam 105 being a simple supporting element, In FIG. 8, if voltage is added to piezoelectric material 700', used as an actuator, through a feed-back controlling part 800, an opposite piezoelectric material 700, used as a sensor, is transformed to generate an electric field. For example, when piezoelectric material 700' is compressed, due to an electric field applied by way of lead 402, load beam 105 bends downwardly, thereby causing piezoelectric material 700 to be extended and to thus generate an electric field which is, in turn, applied to current amplification part 516 by way of lead 401. When piezoelectric material 700' is extended, due to an electric field applied by way of lead 402, load beam 105 bends upward causing piezoelectric material 700 to be compressed and to thus generate an electric field which is, in turn, applied to current amplification part 516 by way of lead 401. The voltage value of the electric field provided to current amplification part 516 is amplified and then input to the controlling part 502. The controlling part 502 receives the amplified output of the current amplification part 516 and manages the amplified output according to the function, i.e., operating mode, of the hard disk drive to apply the amplified output to the feed-back controlling part 800. From this state, the controlling part 502 controls the transformation degree of the piezoelectric material 700 and again controls the bending degree of the load beam 105.

FIGS. 9A–9F are views for explaining start/stop modes of operation under a non-contact relational state of disk 106 and head slider 161 according to the present invention, with the control provided by the device represented by FIG. 8. Accordingly, the control method according to the present invention will be explained with respect to FIGS. 9A–9F.

Figure 9A:
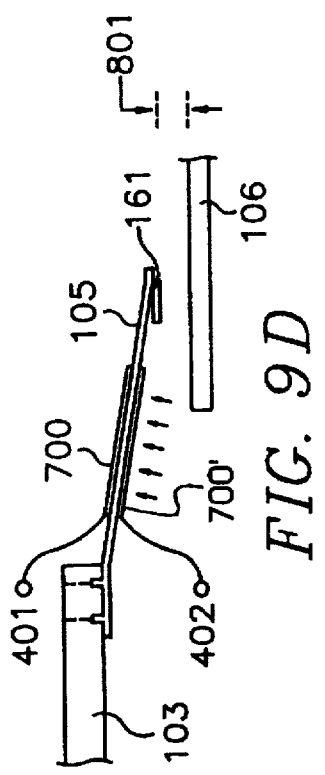
FIGS. 9A–9F are views for explaining the non-contact of the head slider and the disk during start/stop modes of the disk according to the present invention.

FIG. 9A shows an initial state wherein disk 106 is stopped. In FIG. 9A, the piezoelectric material 700 is attached to the upper (top) surface of the resilient portion of load beam 105 and piezoelectric material 700' is attached to a lower (bottom) surface of the resilient portion of the load beam 105, and the head slider 161 is in contact with the parking area of disk 106. The controlling part 502, of FIG. 8, recognizes that during the stop mode, disk 106 is stopped by the output of current amplification part 516 or a function control state signal through wire 401, because piezoelectric material 700 is not deformed and thus does not generate a voltage. Accordingly, controlling part 502 will not generate a control signal, and thus no control signal is applied to piezoelectric material 700' through the feed-back controlling part 800, so that head slider 161, as shown in FIG. 9A, remains in contact with the parking area of disk 106.

Figure 9B:
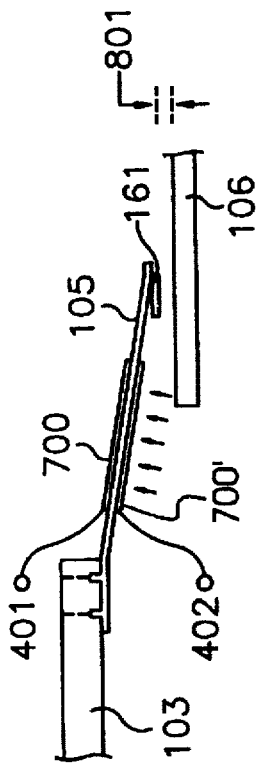

FIG. 9B shows a state just before the start of rotation of disk 106 by provision of powering up of the hard disk drive in a start mode. Initially, in the start mode, the controlling part 502 temporarily applies a control signal to the piezoelectric material 700' through feed-back controlling part 800 and wire 402. Accordingly, piezoelectric material 700' is deformed (compressed or expanded) and the bend in the resilient portion of load beam 105 is reduced so as to separate the head slider 161 from the surface of disk 106. This state is sensed by the piezoelectric material 700 which generates an electric field and the voltage corresponding to this electric field input to current amplification part 516 via wire 401, amplified and supplied as an amplified signal to controlling part 502. The controlling part 502 recognizes the input amplified signal, and then starts and controls the disk rotation. At this time, the flying height 801 or a time in forming the flying height can be adjusted according to the characteristics of controlling part 502 or piezoelectric materials 700 and 700'.

Figure 9C:
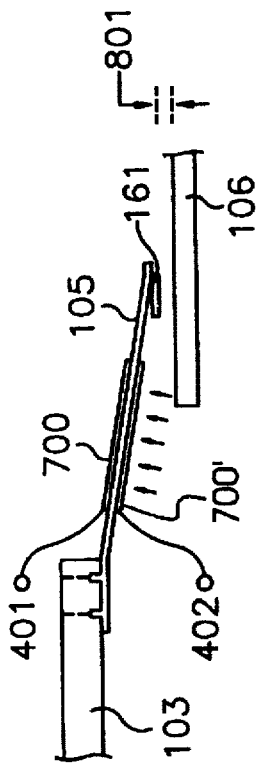

In FIG. 9C, controlling part 502 senses whether the rotation of disk 106 arrives at the constant speed or whether disk 106 has such a speed to fly the head 161. In this state, controlling part 502 does not supply a control signal to piezoelectric material 700' through the feed-back controlling part 800. Accordingly, head slider 161 is freely flown above the surface of the disk under control of the air flow. Of course, it should be understood the control section 502 could apply a control signal to piezoelectric material 700' through feed-back controlling part 800 according to the radial position of head slider 161 above disk 106 so that head slider 161 is kept at a flying height of a predetermined distance above the surface of disk 106 once disk 106 is rotating at a constant speed.

Figure 9D:
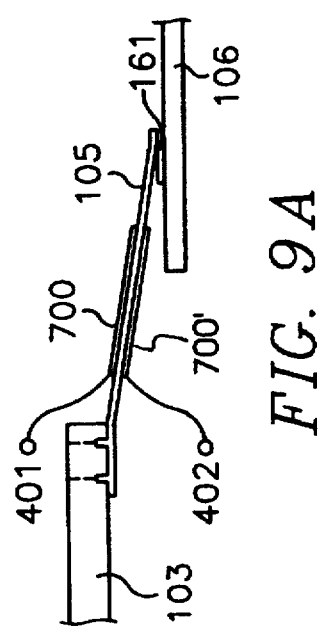

FIG. 9D shows a state just before disk 106 is stopped. The controlling part 502 applies a control signal to piezoelectric material 700' through the feed-back controlling part 800 when disk 106 is at a speed lower than the speed required for flying the head freely, unlike FIG. 9C, so that force is added to load beam 105 to keep head slider 161 separated from the surface of disk 106.

Figure 9E:
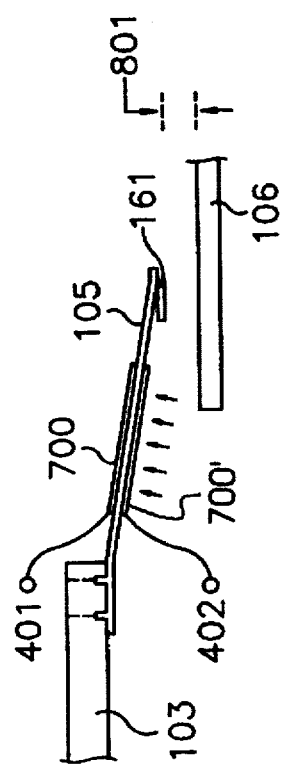

FIG. 9E shows a state that the controlling part 502 continues to apply a control signal to piezoelectric material 700' until disk 106 is completely stopped.

Figure 9F:
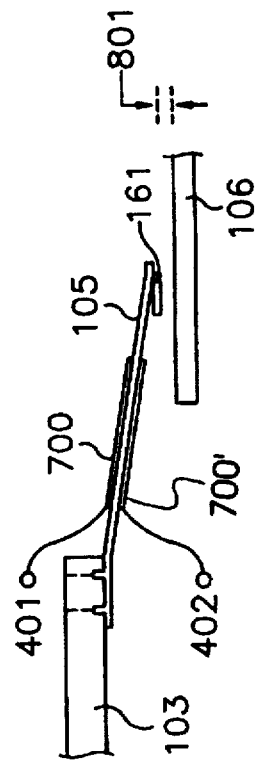

FIG. 9F shows a state that controlling part 502 stops supplying a control signal to piezoelectric material 700' a predetermined time after disk 106 comes to a complete halt.

In this state, the head slider 161 comes into contact with the surface of disk 106 thus avoiding the generation of friction.

According to the control method mentioned above, no friction is generated between the head slider 161 and disk 106, since the controlling part 502 separates the head slider 161 from disk 106 during the start and stop modes of disk 106. Further, if a case arises where friction is generated, the degree of the friction can be adjusted by reducing the time it takes for the head slider 161 to separate from the surface of disk 106, or the delaying of the return of the head slider 161 to the surface of disk 106.

Figure 10:
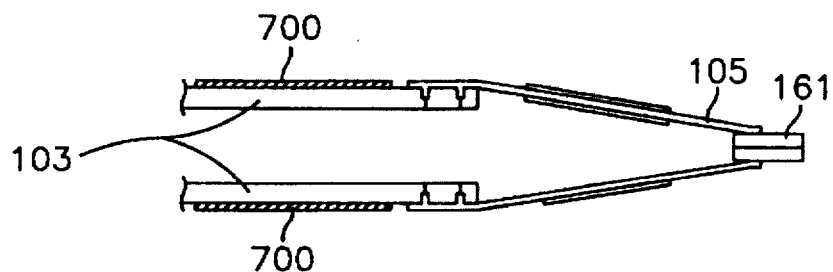
FIG. 10 is a view illustrating an actuator in which a swiss arm is attached to the piezoelectric material according to the principles of the present invention.

In the meantime, as shown in FIG. 10, in a case where arm 103 is flexible, the piezoelectric material 700 is attached to the upper and lower arms 103 and controlled according to the method of FIG. 5. Further, although not shown, piezoelectric materials 700 and 700' could be placed on opposite sides of flexible arms 103 and controlled according to the method of FIG. 8.

Furthermore, there is an efficiency advantageously provided by the foregoing embodiments of the present invention because the gram loads of the head suspension mechanism can be adjusted according to the control of the piezoelectric materials when the flying height is changed, or when the flying height is controlled according to the radial position of the head slider above of the surface of the disk through trial and error during an initial operation among all the operations of the hard disk drive. Thus, various methods for improving the function of the hard disk drive can be achieved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A head suspension mechanism supported by an arm of an actuator in a hard disk drive, said head suspension mechanism comprising:
    a load beam having a resilient portion, a rigid portion and an end portion;
    gimbal means connected to said end portion of said load beam;
    head slider means suspended from said gimbal means;
    a first piezoelectric material formed a bottom surface portion of said resilient portion of said load beam for controlling said load beam in response to a control signal generated by a control means; and
    a second piezoelectric material formed a top surface portion of said resilient portion of said load beam generating a voltage signal in response to movement of said load beam, said control means generating said control signal in response to said voltage signal.

2. The head suspension mechanism as set forth in claim 1, further comprising said first piezoelectric material controlling said load beam to raise said head slider means from a surface of a disk in said hard disk drive before said disk begins to rotate in a start mode of said hard disk drive.

3. The head suspension mechanism as set forth in claim 1, further comprising said first piezoelectric material controlling said load beam to prevent said head slider means from contacting a surface of a disk in said hard disk drive before said disk comes to a complete stop in a stop mode of said hard disk drive.

4. The head suspension mechanism as set forth in claim 1, further comprising said first piezoelectric material controlling said load beam to suspend said head slider means at a predetermined flying height above a surface of a disk in said hard disk drive while said disk is rotating at a constant speed.

5. The head suspension mechanism as set forth in claim 1, further comprising:
    said control means providing said control signal to said first piezoelectric material in a start mode of said hard disk drive, said first piezoelectric material controlling said load beam to raise said head slider means from a surface of a disk in said hard disk drive before said disk begins to rotate;
    said second piezoelectric material generating an electrical signal in response to being deformed by said load beam when said load beam raises said head slider means, said electrical signal being input to said control means for enabling said disk to start rotating.

6. A head suspension mechanism supported by an arm of an actuator in a hard disk drive, said head suspension mechanism comprising:
    a load beam having a resilient portion, a rigid portion and an end portion;
    gimbal means connected to said end portion of said load beam;
    head slider means suspended from said gimbal means;
    a first piezoelectric material attached to a bottom surface portion of said resilient portion of said load beam;
    a second piezoelectric material attached to a top surface portion of said resilient portion of said load beam;
    a controller for controlling at least a starting mode and a stopping mode of a disk in said hard disk drive, said controller generating a control signal at least in response to one of said starting and said stopping modes and providing said control signal to said first piezoelectric material through a feed-back means; and
    amplifying means for amplifying an electrical signal generated by said second piezoelectric material to provide an amplified signal to said controller.

7. The head suspension mechanism as set forth in claim 6, further comprising:
    said controller providing said control signal to said first piezoelectric material in said starting mode;
    said first piezoelectric material controlling said load beam to raise said head slider means from a surface of said disk before said disk begins to rotate; and
    said second piezoelectric material generating said electrical signal in response to being deformed by said load beam when said load beam raises said head slider means;
    said amplifying means amplifying said electrical signal generated by said second piezoelectric material to provide said amplified signal to said controller; and
    said controller starting and controlling disk rotation in response to said amplified signal.

8. The head suspension mechanism as set forth in claim 6, further comprising:
    said second piezoelectric material generating said electrical signal when air flow, caused by rotation of said disk while said disk is rotating at a constant speed, causes a flying height of said head slider means to deviate from a predetermined flying height;

said amplifying means amplifying said electrical signal generated by said second piezoelectric material to provide said amplified signal to said controller; and said controller generating said control signal in response to said amplified signal and providing said control signal to said first piezoelectric material for controlling said load beam to suspend said head slider means at said predetermined flying height above a surface of said disk.

9. The head suspension mechanism as set forth in claim 6, further comprising:

said controller generating said control signal according to a radial position of said head slider means above said disk when said disk is rotating at a constant speed, said controller providing said control signal to said first piezoelectric material for controlling said load beam to suspend said head slider means at a predetermined flying height above a surface of said disk.

10. A method for controlling a head suspension mechanism supported by an arm of an actuator in a hard disk drive, said head suspension mechanism comprising a load beam having a resilient portion, a rigid portion and an end portion, a gimbal connected to said end portion of said load beam, and a head slider suspended from said gimbal, said method comprising the steps of:

attaching a first layer of piezoelectric material to a bottom surface portion of said resilient portion of said load beam;

attaching a second layer of piezoelectric material to a top surface portion of said resilient portion of said load beam;

generating a control signal for inducing a piezoelectric effect in said first layer of piezoelectric material for controlling said load beam to change a vertical position of said head slider with respect to a surface of a disk in said hard disk drive; and generating an electrical signal in response to deformation of said second layer of piezoelectric material.

11. A method for controlling a head suspension mechanism supported by an arm of an actuator in a hard disk drive, said head suspension mechanism comprising a load beam having a resilient portion, a rigid portion and an end portion, a gimbal connected to said end portion of said load beam, and a head slider suspended from said gimbal, said method comprising the steps of:

attaching a first layer of piezoelectric material to a first surface of said resilient portion of said load beam;

attaching a second layer of piezoelectric material to a second surface of said resilient portion of said load beam;

generating a control signal for inducing a piezoelectric effect in said first layer of piezoelectric material for controlling said load beam to raise said head slider from a surface of a disk in said hard disk drive during a start mode; and said second layer of piezoelectric material generating an electrical signal in response to movement of said load beam for controlling the step of generating said control signal.

12. The method as set forth in claim 11, further comprising the step of:

controlling said disk to start rotating during said start mode after said electrical signal is generated by said second layer of piezoelectric material.

13. The method as set forth in claim 12, further comprising the step of:

generating said control signal for inducing said piezoelectric effect in said first layer of piezoelectric material for controlling said load beam to keep said head slider at a predetermined flying height above said disk in response to said electrical signal when said disk is rotating at a constant speed.

14. The method as set forth in claim 13, further comprising the step of:

controlling said load beam to keep said head slider from returning to said surface of said disk before said disk comes to a complete stop during a stop mode by inducing said piezoelectric effect in said first layer of piezoelectric material in response to said electrical signal.

15. The method as set forth in claim 11, further comprising the step of:

controlling said load beam to keep said head slider from returning to said surface of said disk before said disk comes to a complete stop during a stop mode by inducing said piezoelectric effect in said first layer of piezoelectric material in response to said electrical signal.

16. The method as set forth in claim 11, further comprising the step of:

generating said control signal for inducing said piezoelectric effect in said first layer of piezoelectric material for controlling said load beam to keep said head slider at a predetermined flying height above said disk in response to said electrical signal when said disk is rotating at a constant speed.

17. The method as set forth in claim 11, further comprising the step of converting said electrical signal to a voltage signal.

* * * * *